Patented Dec. 1, 1953

2,661,355

UNITED STATES PATENT OFFICE 2,661,355

CARBOMETHOXYBENZAZIDE AND PREPARATION

Mack F. Fuller, Woodbury, N. J., and Paul Van Fossen, Chicago, Ill., assignors to E. I. du Pont de Nemours and Company, Wilmington, Del., a corporation of Delaware No Drawing. Application October 21, 1952,
Serial No. 316,092

2 Claims. (Cl. 260—349)

1

This invention relates to a new composition of matter, particularly a novel chemical compound, namely, p-carbomethoxy benzazide, having the formula

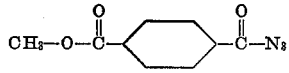

The object of the invention is the preparation of this novel chemical compound and the development of a process for this purpose. Additional objects will be understood from the following description.

According to the present invention p-carbomethoxy benzazide is prepared by the reaction of p-carbomethoxy benzoyl chloride with sodium azide. The invention may be more readily understood from the following example.

Example 1

A mixture of 20 parts by weight of p-carbomethoxy benzoyl chloride, 7.2 parts of sodium azide, 1 part of sodium bicarbonate, and 100 parts of acetone, 95% by weight, was stirred for two hours at 20° C. The product was then precipitated by pouring the mixture into an excess of water. The inorganic salts were dissolved out by stirring the reaction mixture into about 2 liters of ice-water. The product was filtered off, washed free of residual salts with water, and dried in an open tray. The yield was 90.4% of the theoretical yield, based on the acid chloride.

This new chemical compound is a white, crystalline solid, melting at 81°–83° C., with some decomposition, and having a nitrogen content of about 19.7%.

The new chemical compound is useful as a blowing agent and is much more thermally stable than most of the other aromatic carboxylic acid azides, its melting point 81° to 83° C. being higher than would be expected from the melting point of the corresponding ethyl ester.

It is intended that the invention be limited only by the following claims.

We claim:

1. A new chemical compound, p-carbomethoxy benzazide.

2. The process for preparing p-carbomethoxy benzazide which comprises reacting p-carbomethoxy benzoyl chloride with sodium azide.

MACK F. FULLER.
PAUL VAN FOSSEN.

References Cited in the file of this patent

UNITED STATES PATENTS

| Number | Name | Date |
|---|---|---|
| 2,340,757 | Kaase | Feb. 1, 1944 |

OTHER REFERENCES

Davidis, "J. Prak. Chem.," series 2, vol. 54 (1896), page 81.